Apr. 10, 1923.
P. F. HALFERTY
FLY HOOK AND LEADER
Filed Jan. 20, 1922
1,451,656
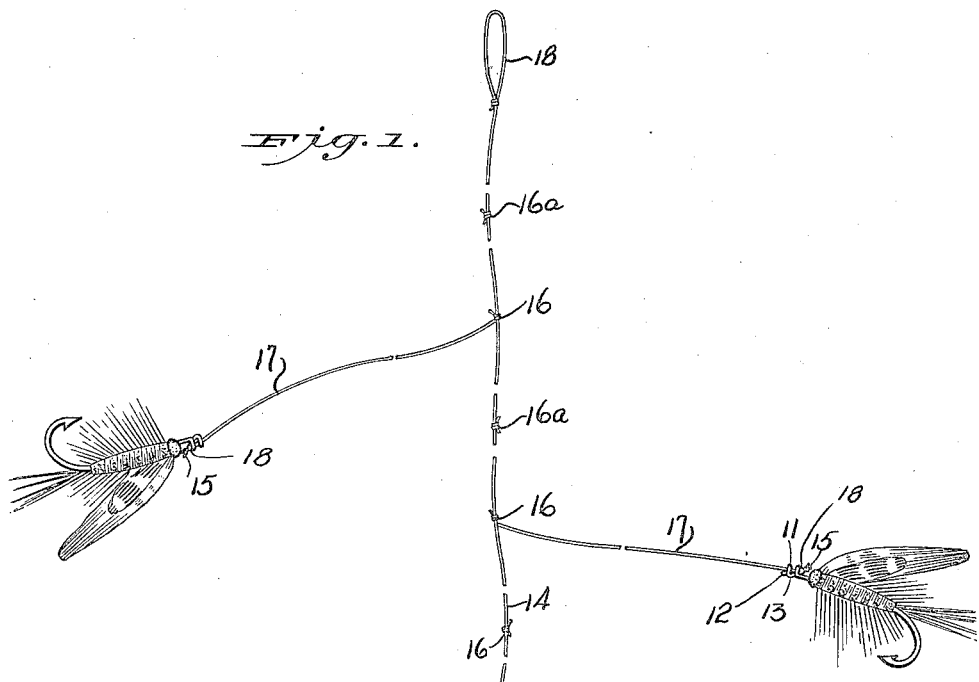
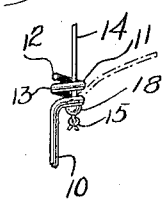
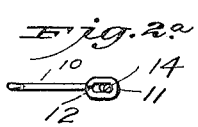
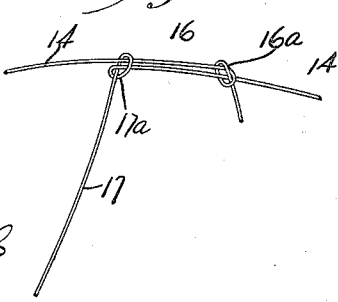
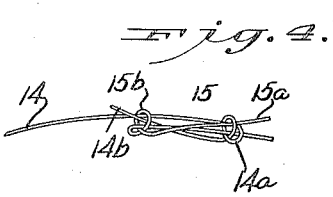
WITNESSES
INVENTOR
P. F. Halferty
BY
ATTORNEYS Patented Apr. 10, 1923.

1,451,656

UNITED STATES PATENT OFFICE.

PETER F. HALFERTY, OF GRAYLAND, WASHINGTON.

FLY HOOK AND LEADER.

Application filed January 20, 1922. Serial No. 530,623.

*To all whom it may concern:*

Be it known that I, PETER F. HALFERTY, a citizen of the United States, and a resident of Grayland, in the county of Grays Harbor and State of Washington, have invented a new and Improved Fly Hook and Leader, of which the following is a description.

My invention while adapted for use with plain hooks to receive a bait is particularly useful for a fly hook and leader arrangement.

The general object of my invention is to provide a quick detachable fish hook and to provide a leader with snells so connected that the use of the undesirable loops now employed is obviated as well as to provide a novel knot on the lower end of the leader particularly adapted to coact with my improved hook.

Reference is to be had to the accompanying drawings forming a part of this specification, it being understood that the drawings are merely illustrative of one example of the invention.

Figure 1 is an elevation of my leader and snells and equipped with hooks in accordance with my invention;

Figure 2 is an enlarged fragmentary view showing the attaching ends of the hook and leader;

Figure 2$^a$ is a plan view given to show the oval shape of the coil on the hook;

Figure 3 is an enlarged view of the incompleted knot at the juncture of a snell;

Figure 4 is a view of the incompleted knot at the lower end of the leader, it being given to show the manner of forming the knot.

In carrying out my invention in accordance with the illustrated example, the fish hook 10 has the attaching end of the shank thereof formed with a twist or coil 11 advantageously of approximately oval form to present a major and a minor axis, through which a leader or snell may be passed, the oval form of the coil serving to better prevent accidental disengagement of the hook. The end 12 of the coil is spaced, as indicated at 13, from the adjacent bend of the coil to snugly accommodate a leader of gut or other suitable material and adjacent bends or convolutions are similarly separated for a leader 14, for example, to be entered and removed with facility.

It will be observed that the lowermost bend of the twist or coil, or that bend adjacent to the body of the shank, is at an angle to the shank slightly less than a right angle so that the knot 15 on leader and the snells will be caused to pass into the bight of the lowermost turn or convolution of the coil and laterally away from the shank so as not to have a tendency to pass out of the twist or coil.

It will be observed that the knot 15 is formed of the lower terminal of the leader 14 and an additional short length of gut 15$^a$. In producing the knot a plain knot 14$^a$ is formed in the leader 14 a short distance from the end and the additional gut element 15$^a$ is formed with a plain knot 15$^b$. The extreme end 14$^b$ of leader 14 is returned on itself and passed through the plain knot 15$^b$ of the element 15$^a$. Similarly, said element 15$^a$ is returned on itself from the intermediate knot 15$^b$ and the extreme ends passed through the plain knots 14$^a$ of the leader. The elements 15$^a$ and 14$^a$ are given longitudinal movement one on the other until the knots 14$^a$, 15$^b$ are drawn into close relation after which the surplus ends of the element 15$^a$ are cut off so that the knot 15 has the appearance of a single knot as shown clearly in Figure 2.

The leader 14 of gut or other suitable material is formed of two or more lengths, according to the number of snells 17 to be provided, each snell being formed of the lower end of a leader section, the sections being connected by knots 16. The manner of forming the knots 16 is shown in Figure 3 in which it will be seen that one leader section has a plain knot 16$^a$ formed therein and the snell 17 has a similar plain knot 17$^a$ formed therein, the one leader section passing through the plain knot of the other leader section. The plain knots 16$^a$, 17$^a$ are then drawn together. Intermediate knots 16$^a$ may unite leader sections between the snells 17, said knots 16$^a$ being formed the same as the knots 16.

By the described arrangement of the leader and snells, the usual cumbersome loops generally employed are done away with. Also, the end knot 15 is given a size to adapt it to coact with the helical coil 11 in effecting connection between the leader and the hook.

The numeral 18 indicates a bead provided on the snells and leaders adjacent to the knot so as to be positioned between the knot and the first bend of the coil on the shank of the hook.

The coil on the hook, it is to be noted, serves for swivelling the hook to the leader or snell.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. A leader having a knot at its lower end, and a separate length of material incorporated in said knot, said separate length of material and the said leader each having a plain knot and return bent at said plain knots, the leader and its returned portion both passing through the plain knot of the separate length and the returned portions of the separate length being passed through the plain knot of the leader, said plain knots being brought together into close relation.

2. In a fishing device, a leader formed of sections, one knotted to another, the lower end of one section being continued through the knot to extend laterally and constitute a snell.

3. In a fishing device, a leader having a snell thereon, said leader being formed in sections and the snell being a continuation of an end of a leader section, the respective sections having plain knots near their adjacent ends, each section being passed through the plain knot of the other section and said plain knots being drawn into close contact.

PETER F. HALFERTY.